United States Patent Office 3,299,066
Patented Jan. 17, 1967

3,299,066
CYANOETHYLATED 6-AMINOURACILS
Viktor Papesch, Morton Grove, Ill., assignor to G. D. Searle & Co., Chicago, Ill., a corporation of Delaware
No Drawing. Filed Oct. 12, 1964, Ser. No. 403,325
6 Claims. (Cl. 260—256.4)

This application is a continuation-in-part of copending applications Serial No. 323,064 and Serial No. 323,071, both filed November 12, 1963, and which have respectively issued as Patent No. 3,235,554 and Patent No. 3,235,555, on February 15, 1966.

The present invention relates to a group of compounds which are cyanoethylated derivatives of 6-aminouracil. In particular, it relates to compounds of the following general formula

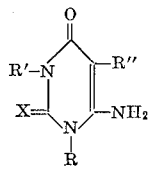

wherein X is selected from the group consisting of O and S; R is selected from the group consisting of lower alkyl, lower alkenyl, and hydroxyethyl; R' is selected from the group consisting of hydrogen, lower alkyl, and cyanoethyl; R" is selected from the group consisting of hydrogen and cyanoethyl; and the groups R' and R" are selected in such a way that at least one of them is cyanoethyl.

The lower alkyl radicals referred to above contain up to 6 carbon atoms and are exemplified by radicals such as methyl, ethyl, propyl, butyl, pentyl, and hexyl. The lower alkenyl radicals referred to above likewise contain up to 6 carbon atoms and can be exemplified by radicals such as allyl and methallyl.

The compounds of this invention are useful because of their pharmacological properties. In particular, the present compounds are useful anti-ulcer agents. This is particularly demonstrated by their inhibition of ulceration in the Shay rat. The present compounds are also appetite inhibitors and hypocholesterolemic agents. The latter activity involves the inhibition of hepatic synthesis of cholesterol.

Those uracils having a cyanoethyl substituent at the 5-position can further be used as intermediates in the preparation of 7 - amino - 1,2,3,4,5,6 - hexahydropyrido-[2,3-d]pyrimidines of the formula

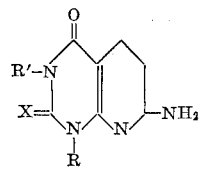

wherein R, R' and X are defined as above. The cyclization is brought about by a quaternary ammonium hydroxide such as trimethylbenzylammonium hydroxide.

The compounds of the present invention are prepared from the appropriately substituted 6-aminouracil and acrylonitrile. The reaction is generally carried out at reflux in a solvent mixture consisting of water and an organic base such as pyridine. A quaternary ammonium base can additionally be present in the reaction mixture to serve as a catalyst. One base particularly useful as a catalyst is trimethylbenzylammonium hydroxide.

The compounds which constitute this invention and their preparation are illustrated by the following examples which should not be construed as limiting the invention in spirit or in scope. In these examples, quantities are indicated in parts by weight unless parts by volume are indicated, and temperatures in degrees centigrade (° C.). The relationship between parts by weight and parts by volume is the same as that existing between grams and milliliters.

Example 1

80 parts of 6-amino-1-propyluracil, 400 parts by volume of 50% by volume pyridine-water, and 65 parts of acrylonitrile are mixed and then refluxed for 3 hours. An additional 65 parts of acrylonitrile is then added and refluxing is resumed for an additional 3 hours. The resultant mixture is then filtered and low boiling material is removed from the filtrate by heating on a steam bath under reduced pressure. 40 parts of water is added to the residue and the mixture is evaporated to dryness again. The resultant residue is then treated with 200 parts of boiling methanol and the suspension which results is filtered while hot. The filtered solid is washed with hot methanol and ether and then recrystallized twice from 50% ethanol to give 6-amino-5-(2-cyanoethyl)-1-propyluracil melting at about 250–252° C.

Example 2

To a solution of 116 parts of 6-amino-1-allyluracil and 1300 parts by volume of a 50% by volume pyridine-water mixture, there is added 185 parts of acrylonitrile and the resultant mixture is refluxed for 2 hours. Then, 95 parts of acrylonitrile is added and the mixture is refluxed for 2 hours. The addition of acrylonitrile followed by refluxing is then repeated twice and the mixture is refluxed for 3 hours after the addition of the final portion of acrylonitrile. Low boiling materials are then removed from the reaction mixture by heating it on a steam bath under reduced pressure. The residue is a syrup which is mixed with 500 parts of boiling water and filtered while hot. The aqueous filtrate obtained in this way is evaporated to dryness under reduced pressure on a steam bath. The residue is a glassy material which is boiled with 1100 parts of ethyl acetate to give a suspension which is then filtered. The resultant filtrate is diluted with 1050 parts of benzene and filtered. The new filtrate is chromatographed on a silica gel column. The column is eluted with increasing amounts of ethyl acetate in benzene. A number of fractions are obtained from elution with 70% ethyl acetate in benzene. The first fractions are combined, the solvent is evaporated, and the resultant residue is recrystallized repeatedly from a mixture of 50% ethyl acetate and methanol to give 6-amino-3-(2-cyanoethyl)-1-allyluracil melting at about 167–168° C.

The later fractions obtained from elutions of the column with 70% ethyl acetate in benzene are combined and the solvent is evaporated to leave a residual material which is recrystallized from methanol to give 6-amino-5-(2-cyanoethyl)-1-allyluracil melting at about 262–263° C.

Example 3

50 parts of 6-amino-1,3-dimethyluracil is ground to a fine powder, mixed with 260 parts by volume of a 50% by volume pyridine-water mixture and with 40 parts of acrylonitrile and refluxed for 3 hours. The resultant mixture is cooled and filtered and the solvent is evaporated from the filtrate to leave a residual syrup. This residue is dissolved in 100 parts by volume of 10% methanol in ethyl acetate and treated with charcoal. The resultant solution is cooled and the precipitate which forms is separated and crystallized from methanol to give 6-amino-5-(2-cyanoethyl)-1,3-dimethyluracil which melts at about 232–235° C. and then resolidifies.

Example 4

A mixture of 21 parts of 6-amino-1,3-diethyluracil, 70 parts by volume of a 50% by volume pyridine-water mixture, 17 parts of acrylonitrile, and 5 parts by volume of a 40% aqueous solution of trimethylbenzylammonium hydroxide is refluxed for 2.5 hours. The resultant mixture is cooled and filtered and the filtrate is heated on a steam bath to remove low boiling materials and leave a residual syrup. This is dissolved in a 10% solution of methanol in ethyl acetate and the resultant solution is chromatographed on a silica gel column. The column is eluted with increasing amounts of methanol in ethyl acetate and the solvent is evaporated from the eluate obtained by elution with 10% methanol in ethyl acetate and the readily soluble portion of the residue is recrystallized from ethyl acetate to give 6-amino-5-(2-cyanoethyl)-1,3-diethyluracil melting at about 147° C. This compound has the following formula

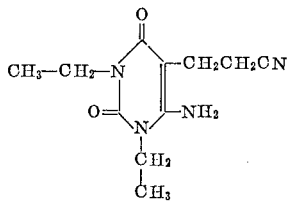

Example 5

A solution of 140 parts of 6-amino-3-ethyl-1-(2-hydroxyethyl)uracil and 80 parts of acrylonitrile in 100 parts by volume of a 50% by volume pyridine-water mixture is heated and 10 parts by volume of trimethylbenzylammonium hydroxide is added. An exothermic reaction ensues and the mixture boils for about 2 minutes. The solvent is then evaporated under reduced pressure, the residue is dissolved in water and the solvent is again evaporated under reduced pressure. This treatment is repeated once more with water and then with methanol. The resultant residue is dissolved in 800 parts of acetone and allowed to stand for several days; a precipitate forms and is removed by filtration. The solvent is evaporated from the filtrate and the residue is dissolved in ethyl acetate, allowed to stand and then chromatographed on a silica gel column. The later fractions eluted with 100% ethyl acetate are combined, the solvent is evaporated, and the residue is dissolved in a minimum amount of acetone. A precipitate forms on standing; this is separated and recrystallized from acetone to give 6-amino-5-(2-cyanoethyl)-3-ethyl-1-(2-hydroxyethyl)uracil melting at about 171–173° C.

Example 6

A mixture of 100 parts of 6-amino-1-ethyluracil, 1200 parts by volume of a 50% by volume pyridine-water mixture and 80 parts of acrylonitrile is refluxed for 3 hours. An additional 80 parts of acrylonitrile is added and the mixture is refluxed for an additional 2 hours. The addition of acrylonitrile and subsequent refluxing is then repeated twice. The resultant mixture is filtered over charcoal and the solvent is evaporated from the filtrate on a steam bath to leave a thick paste which is stirred with 120 parts of water. Acetic acid is then added to neutralize the mixture which is then filtered. The solvent is evaporated from the filtrate under reduced pressure to leave a residual syrup which is dissolved in water. The resultant mixture is filtered to remove a small amount of precipitate which appears on standing and the resultant filtrate is evaporated to leave a residual syrup which then turns to a glass. The glassy residue is heated with 900 parts of boiling ethyl acetate and the resultant mixture is filtered and diluted with 900 parts of benzene. This solution is then allowed to stand for 15 hours, decanted from some precipitate, and chromatographed on a silica gel column. The column is eluted with increasing amounts of ethyl acetate in benzene and then with acetone. The solvent is evaporated from the acetone eluate to leave a residual material which is crystallized from methanol to give 6-amino-3-(2-cyanoethyl)-1-ethyluracil melting at about 243–244° C.

Example 7

A mixture of 80 parts of 6-amino-1-propyluracil and 65 parts of acrylonitrile in 400 parts by volume of a 50% by volume pyridine-water mixture is refluxed for 3 hours. Then, 65 parts of acrylonitrile is added and refluxing is continued for an additional 3 hours. The addition of the acrylonitrile and refluxing is again repeated. The solution which results is evaporated to dryness under reduced pressure, 50 parts of water is added to the residue, and the mixture is again evaporated to dryness. The resultant residue is dissolved in 200 parts of boiling methanol and allowed to stand for 2 days before it is filtered. The resultant filtrate is evaporated to dryness under reduced pressure to give a residual syrup which is dissolved in hot ethyl acetate. A precipitate then forms and this is separated by filtration and recrystallized twice from water to give 6-amino-3-(2-cyanoethyl)-1-propyluracil melting at about 202–203° C.

Example 8

A mixture of 50 parts of 6-amino-1-methallyl-2-thiouracil, 400 parts by volume of a 50% by volume pyridine-water mixture and 80 parts of acrylonitrile is refluxed for 2 hours. Then 40 parts of acrylonitrile is added and refluxing is resumed for an additional 2 hours. The addition of acrylonitrile and subsequent refluxing is repeated once more. The solvent is then evaporated from the reaction mixture on a steam bath under reduced pressure and the residue is dissolved in 360 parts of ethyl acetate and diluted with 360 parts of benzene. The resultant mixture is filtered to remove a small amount of precipitate and the filtrate is chromatographed on a silica gel column. The column is eluted with 50% ethyl acetate in benzene. The later fractions obtained using this eluant are combined and the solvent is evaporated to leave the residue which is repeatedly crystallized from methanol to give 6-amino-3-(2-cyanoethyl)-1-methallyl-2-thiouracil melting at about 174–175° C.

Example 9

A mixture of 100 parts of 6-amino-1-ethyluracil, 1200 parts by volume of a 50% by volume pyridine-water mixture, and 80 parts of acrylonitrile is refluxed for 3 hours. An additional 80 parts of acrylonitrile is added and refluxing is resumed for an additional 2 hours. This process is repeated twice. The final mixture is then heated on a steam bath under reduced pressure to remove low boiling materials. A thick pasty residue remains and this is stirred with 120 parts of water and 5 parts of acetic acid and then filtered. The solvent is evaporated from the filtrate to leave a glassy solid. A portion of this solid (25 parts) is stirred with 225 parts of ethyl acetate and filtered and the resultant filtrate is diluted with 225 parts of benzene and filtered again. The resultant ethyl acetate-benzene solution is chromatographed on a silica gel column. The column is then eluted with increasing quantities of ethyl acetate in benzene and the solvent is evaporated from the fractions eluted with 80% ethyl acetate in benzene. The residual solid is recrystallized from methanol to give 6-amino-1-ethyl-3,5-bis(2-cyanoethyl)uracil melting at about 170–171° C. This compound has the following formula

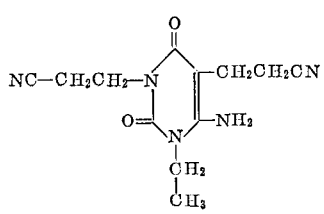

Example 10

To a solution of 80 parts of 6-amino-1-propyluracil and 400 parts by volume of a 50% by volume pyridine-water solution, there is added 65 parts of acrylonitrile and the resultant solution is refluxed for 3 hours. An additional 65 parts of acrylonitrile is added and refluxing is resumed for an additional 2 hours. The resultant mixture is heated on a steam bath under reduced pressure to remove the low boiling materials. 50 parts of water is added to the residue and this is again evaporated to dryness. Then, 200 parts of hot methanol is added and mixed with the solid and the resultant suspension is filtered while hot. The filtrate is cooled and filtered and the solvent is evaporated from this new filtrate. The residue is dissolved in ethyl acetate, chromatographed on a silica gel column, and eluted with increasing quantities of methanol in ethyl acetate. The fraction eluted with 2% methanol in ethyl acetate is evaporated to dryness and then dissolved in 50% ethyl acetate in benzene and again chromatographed on a silica gel column. The column is eluted with increasing quantities of ethyl acetate in benzene. The fraction eluted with 60% ethyl acetate in benzene is evaporated to dryness and the residue is recrystallized from water and dried to give 6-amino-1-propyl-3,5-bis(2-cyanoethyl)uracil which softens at about 120° C. and then melts completely at about 145° C.

Example 11

To a solution of 116 parts of 6-amino-1-allyluracil and 1300 parts by volume of 50% by volume pyridine-water solution, there is added 185 parts of acrylonitrile and the resultant solution is refluxed for 2 hours. Then, 95 parts of additional acrylonitrile is added and reflux is continued for an additional 2 hours. This procedure is repeated twice and the reflux period is extended to 3 hours after the last addition. The mixture is then heated on a steam bath under reduced pressure to distill off low boiling materials. The residual solid is diluted with 500 parts of boiling water and filtered hot. The solvent is evaporated from the above filtrate to leave a glassy residue. This residue is boiled with 1100 parts of ethyl acetate and filtered and the filtrate is diluted with 1050 parts of benzene and filtered. The filtrate is absorbed on a silica gel column and eluted with increasing quantities of ethyl acetate in benzene. The later fractions from the eluate from 50% ethyl acetate in benzene are separated, the solvent is evaporated, and the residue is recrystallized from 10% methanol in ethyl acetate to give 6-amino-1-allyl-3,5-bis(2-cyanoethyl)uracil melting at about 151° C.

Example 12

30 parts of 6-amino-1-ethyl-2-thiouracil is dissolved in 180 parts by volume of a 50% by volume pyridine-water mixture and 48 parts of acrylonitrile is added. The mixture is refluxed for 3 hours, 25 parts of acrylonitrile is added, and refluxing is continued for an additional 2 hours. The addition of acrylonitrile and subsequent refluxing is repeated twice. The solvent is evaporated from the resultant solution under reduced pressure and the residual syrup is stirred with hot ethyl acetate. The resultant mixture is allowed to stand for several hours and the solution is decanted from insoluble material and chromatographed on a silica gel column. The column is eluted with ethyl acetate and the first fractions are combined, the solvent is evaporated, and the residue is recrystallized from ethanol to give 6-amino-3,5-bis(2-cyanoethyl)-1-ethyl-2-thiouracil melting at about 175–177° C.

The starting material used is prepared by the following procedure. 18 parts of sodium metal is dissolved in 240 parts of absolute ethanol and 90 parts of 1-ethylthiourea is dissolved in the resultant solution. Then, 110 parts of ethyl cyanoacetate is added and the resultant mixture is refluxed for 2.5 hours. The solvent is then evaporated under reduced pressure and the residue is dissolved in 400 parts of water and neutralized with 35 parts of acetic acid. The resultant mixture is cooled and filtered and the filtered precipitate is washed with water and with acetone and then recrystallized from 50% ethanol to give 6-amino-1-ethyl-2-thiouracil melting at about 249–250° C. Other 6-amino-2-thiouracils are obtained in the same manner.

What is claimed is:

1. A compound of the formula

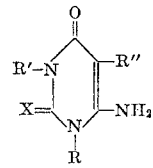

wherein X is selected from the group consisting of O and S; R is selected from the group consisting of lower alkyl, lower alkenyl, and hydroxyethyl; R' is selected from the group consisting of hydrogen, lower alkyl and cyanoethyl; R" is selected from the group consisting of hydrogen and cyanoethyl; and R' and R" are selected in such a way that at least one of them is cyanoethyl.

2. A compound of the formula

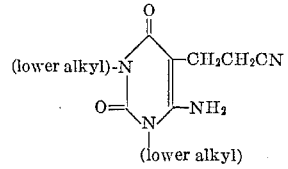

3. 6-amino-5-(2-cyanoethyl)-1,3-diethyluracil.
4. 6 - amino - 5 - (2 - cyanoethyl) - 3 - ethyl - 1 - (2-hydroxyethyl)uracil.
5. 6-amino-1-allyl-3-(2-cyanoethyl)uracil.
6. 6-amino-5-(2-cyanoethyl)-1-propyluracil.

No references cited.

ALEX MAZEL, *Primary Examiner.*

MARY U. O'BRIEN, *Assistant Examiner.*

UNITED STATES PATENT OFFICE
CERTIFICATE OF CORRECTION

Patent No. 3,299,066

January 17, 1967

Viktor Papesch

It is hereby certified that error appears in the above numbered patent requiring correction and that the said Letters Patent should read as corrected below.

Column 1, lines 52 to 58, the formula should appear as shown below instead of as in the patent:

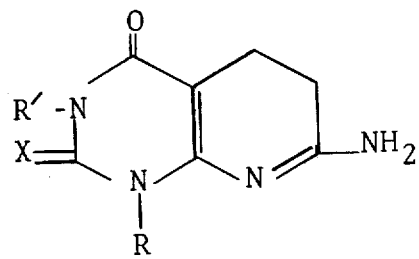

Signed and sealed this 28th day of November 1967.

(SEAL)
Attest:

EDWARD M. FLETCHER, JR.
Attesting Officer

EDWARD J. BRENNER
Commissioner of Patents